US006483498B1

(12) United States Patent
Colgan et al.

(10) Patent No.: US 6,483,498 B1
(45) Date of Patent: Nov. 19, 2002

(54) LIQUID CRYSTAL DISPLAY WITH INTEGRATED RESISTIVE TOUCH SENSOR

(75) Inventors: Evan G. Colgan, Chestnut Ridge, NY (US); Eisuke Kanzaki, Fujisawa (JP); Satoshi Karube, Kamakura (JP); Mikio Kurihara, Yamato (JP); James L. Levine, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,127

(22) Filed: Mar. 17, 1999

(51) Int. Cl.[7] .................................................. G09G 5/00
(52) U.S. Cl. ...................... 345/173; 345/174; 349/155; 178/18.05
(58) Field of Search ................................. 345/173–179, 345/104; 178/18.01–18.09, 19.01–19.07; 349/12, 155

(56) References Cited

U.S. PATENT DOCUMENTS

| 3,798,370 | A | | 3/1974 | Hurst |
|---|---|---|---|---|
| 3,911,215 | A | | 10/1975 | Hurst et al. |
| 4,071,689 | A | | 1/1978 | Talmage et al. |
| 4,220,815 | A | | 9/1980 | Gibson et al. |
| 4,293,734 | A | | 10/1981 | Pepper, Jr. |
| 5,510,813 | A | * | 4/1996 | Makinwa et al. ............ 345/173 |
| 5,518,078 | A | * | 5/1996 | Tsujioka et al. .............. 178/18 |
| 5,670,755 | A | * | 9/1997 | Kwon .......................... 178/19 |
| 5,847,690 | A | * | 12/1998 | Boie et al. ................... 345/104 |
| 5,852,487 | A | * | 12/1998 | Fujimori et al. ............. 349/162 |
| 5,945,980 | A | * | 8/1999 | Moissev et al. ............. 345/173 |

OTHER PUBLICATIONS

Jim Schuessler, "Pen and Touch Input Solutions For Portable Devices", Proceedings of the Fourth Annual Portable by Design Conference, Mar. 24–27, 1997, pp. 473–478.
Celia Skipton, "You Can Touch This!", published in NewMedia, Feb. 10, 1997.

* cited by examiner

Primary Examiner—Steven Saras
Assistant Examiner—Amr Awad
(74) Attorney, Agent, or Firm—F. Chau & Associates, LLP (57) ABSTRACT

A liquid crystal display, in accordance with the present invention, includes a first substrate having a first conductive layer formed thereon. A linearization pattern is formed on the first conductive layer for applying voltage gradients across the first conductive layer. A flexible polarizer is included having a second conductive layer formed thereon facing the first conductive layer across a gap formed therebetween, the polarizer providing a contact surface such that a touched position on the polarizer causes contact between the first conductive layer and the second conductive layer thereby identifying a location of the touched position.

25 Claims, 5 Drawing Sheets

LIQUID CRYSTAL DISPLAY WITH INTEGRATED RESISTIVE TOUCH SENSOR

BACKGROUND OF THE INVENTION

1. Field of the Invention

The present invention relates to liquid crystal displays (LCD's) employing means for measuring touch position, and, more particularly to LCDs wherein such touch measuring means is integrated into a substrate of the LCD.

2. Description of the Related Art

Touch input systems which determine the location of an object or person touching a surface are utilized in a wide variety of applications and require that the location of the touch be determined with a high degree of accuracy. Typically, these devices are transparent and are fitted directly over a computer display. Examples of such add-on touch screens which can be fitted over a CRT or flat panel display may be found in "You can touch this! Touch screens deliver multimedia to the masses" by C. Skipton, New Media, Feb. 10, 1997, p. 39–42. One disadvantage of add-on touch screens is that they increase the weight and size of the display unit. This weight and size increase is not desirable for portable applications, such as notebook computers. Further, the communications to the computer for the add-on often requires an available card slot, serial port or parallel port adapter.

These disadvantages of using an add-on touch screen can be greatly reduced by the integration of the touch sensor into the LC display. Touch input systems have used a variety of methods for determining the touch location. The two methods which can be integrated into an liquid crystal display with the lowest cost and the fewest modifications are the capacitive and the resistive membrane techniques.

A disadvantage of the capacitive technique is that it requires a tethered stylus for precision input whereas the resistive technique works with a finger or any stylus with an appropriate tip radius.

The resistive membrane technique operates by pressing two conductive layers together and sensing the position of the contact. The general method of operation of "4-wire" and "5-wire" systems are described in "Pen and touch input solutions for portable devices", J. Schuessler in Proc. of the Fourth Annual Portable by Design Conference, Mar. 24–27, 1997, Santo Clara Calif., Penton Publishing, 1997, pp. 473–478. The sensor typically includes two conductive layers separated by insulating spacers where the top sheet is flexible. The bottom sheet can either be a rigid material such as glass or a flexible material such as plastic. The conductive layer is typically an Indium Tin Oxide (ITO) layer which is deposited on the facing surfaces of the plastic and glass layers. The radius of curvature which is needed to press the conductive layers together is determined by the spacing and height of the spacer bumps. (See U.S. Pat. Nos. 3,798,370 and 3,911,215, both incorporated herein by reference). When used directly on a display device, i.e., not as a separate digitizer, the various layers which make up the resistive touch sensor are transparent in the active area. See U.S. Pat. Nos. 4,071,689 and 4,220,815 both incorporated herein by reference.

In the more common 4-wire method, used in the majority of small portable devices with touch input, a uniform voltage gradient is applied to one of the conductive layers and sensed on the second conductive layer (at the point of contact) to determine the touch location in one direction. The location in the second direction is determined by applying a uniform voltage gradient in the direction perpendicular to the first gradient on the second conductive layer and sensing the voltage on the first conductive layer. By continuously alternating the direction and location of the applied voltage gradient and sensing locations, the touch locations can be determined. An advantage of this method is that the individual conductive layers only need to be "linearized" in one direction. This is typically accomplished by depositing a layer of ITO (or other resistive material) which is substantially uniform in resistivity, and electrodes on the two opposite edges of the ITO coated surface. The electrodes are usually made of a material which is more conductive than the surface, and the electrodes are often silk-screened onto the surface. A major disadvantage of the 4-wire method is that the ITO layer on the flexible top sheet cracks after repeated use which results in nonlinearities in the applied electric field, which causes location errors.

In the 5-wire method, the problem with cracks in the ITO layer on the flexible top sheet is greatly reduced by using the ITO layer on the flexible top sheet only as the sensing layer. This requires that the bottom conductive layer be "linearized" so that uniform voltage gradients can be applied in two orthogonal directions. The general approach used to linearize the electric field is to pattern openings into the ITO layer, deposit a pattern of lower resistivity, or use a combination of both. There is patent literature on such methods for electric field linearization for touch input systems. Typically, 5-wire touch input devices have lifetimes an order of magnitude greater than 4-wire systems and are used for larger screen sizes and usually mounted over CRT displays for kiosk applications. Add-on 5-wire resistive membrane touch screens are available from MicroTouch Systems, Inc. (Methuen, Mass.), Elo TouchSystems, Inc. (Fremont, Calif.), or Carroll Touch, Inc. (Round Rock, Tex.), for example. In all cases, a rigid bottom glass substrate is used on which an electrode pattern is formed around the edge to linearize the electric field. The location sense methods used are somewhat different in the MicroTouch device. A voltage is applied to the conductor on the flexible top sheet. When contact is made, currents flow to the four corners of the sensing (bottom) conductive layer and are measured simultaneously. The contact location is calculated based on that relative current flow in each corner (See U.S. Pat. No. 4,293,734, incorporated herein by reference). The Elo TouchSystems and Carroll Touch devices function similar to the 4-wire device and alternately apply perpendicular field gradients but the gradients are only applied to the linearized resistive layer. The conductive layer on the flexible layer is always used for sensing the contact position (See, U.S. Pat. No. 3,798,370).

The use of a conventional 5-wire resistive membrane overlay touch screen is not acceptable for portable use because of the added size and weight of a glass substrate. If a rigid glass substrate in a conventional system is replaced by a thinner and lighter plastic substrate, the greater compliance of the plastic substrate may result in the linearized ITO layer developing cracks which would reduce the lifetime of the device.

Therefore, a need exists for an integrated resistive touch sensor for liquid crystal displays which is lighter and thinner than conventional devices and provides little or no additional attenuation of light emitted from the display.

SUMMARY OF THE INVENTION

A liquid crystal display with an integrated touch sensor, in accordance with the present invention, includes a first substrate having a first conductive layer formed thereon. A linearization pattern is formed on the first conductive layer for applying a voltage gradient across the first conductive layer. A flexible polarizer is included having a second conductive layer formed thereon facing the first conductive layer across a gap formed therebetween, the polarizer providing a contact surface such that a touched position on the polarizer causes contact between the first conductive layer and the second conductive layer thereby identifying a location of the touched position.

Another liquid crystal display with an integrated touch sensor includes a first substrate having a first conductive layer formed thereon. A flexible polarizer has a second conductive layer formed thereon facing the first conductive layer across a gap formed therebetween. The polarizer provides a contact surface such that a touched position on the polarizer causes contact between the first conductive layer and the second conductive layer thereby identifies a location of the touched position by employing a first voltage gradient being provided across the first conductive layer while the second conductive layer is employed as a sensor layer for the touched position, and a second voltage gradient is provided orthogonally to the first voltage gradient across the second conductive layer while the first conductive layer is employed as the sensor layer for the touched position.

Yet another embodiment of the present invention includes another liquid crystal display including a first substrate having a first conductive layer formed thereon, and a flexible polarizer having a second conductive layer formed thereon facing the first conductive layer across a gap formed therebetween. A linearization pattern is formed on the second conductive layer for applying a voltage gradient across the second conductive layer, and the polarizer provides a contact surface such that a touched position on the polarizer causes contact between the first layer and the second layer thereby inducing current flow across electrodes connected to the second conductive layer thereby identifying a location of the touched position. In alternate embodiments, the flexible polarizer may include a flexible plastic material. The first and second conductive layers preferably include at least one of Indium Tin Oxide and Indium Zinc Oxide. The first substrate is preferably a rigid transparent material. The first substrate preferably includes a color filter plate. The linearization pattern may be formed about a periphery of the first substrate and includes at least three electrodes for providing the voltage gradient. The polarizer may be coupled to the first substrate about a periphery of the first substrate. The gap may maintained by employing insulating spacers. The spacers may be employed to attach the first and second conductive layers. The spacers may be disposed in operational relationship with a black matrix formed on the first substrate. The gap may be filled with an index matched insulating liquid to reduce light reflections. Low resistance electrodes may be formed on opposite edges of each of the two conductive layers so that a uniform voltage gradient can be formed in a single direction on each sheet where these directions are orthogonal to each other. A first voltage gradient may be provided across the first conductive layer while the second conductive layer is employed as a sensor layer for the touched position and a second voltage gradient may be provided orthogonally to the first voltage gradient across the second conductive layer while the first conductive layer is employed as the sensor layer for the touched position. These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to liquid crystal displays (LCD's) employing a touch position sensor which is incorporated into a substrate of the LCD. The invention integrates a 5-wire resistive membrane touch sensor into a LCD structure by the use of the LCD's plastic polarizer as a deformable resistive sheet. A color filter plate is employed as a glass substrate. This is accomplished by adding a transparent conductive layer onto the bottom of the polarizer, separating the polarizer from color filter glass with insulating spacer bumps, and forming a transparent linearized resistive layer on the back of the LCD color filter. In accordance with the present invention, which preferably uses the existing color filter glass as a substrate for the linearized resistive layer and the existing plastic polarizer as the flexible membrane for the sensing conductive layer, the added size and weight is minimized.

Figure 1:
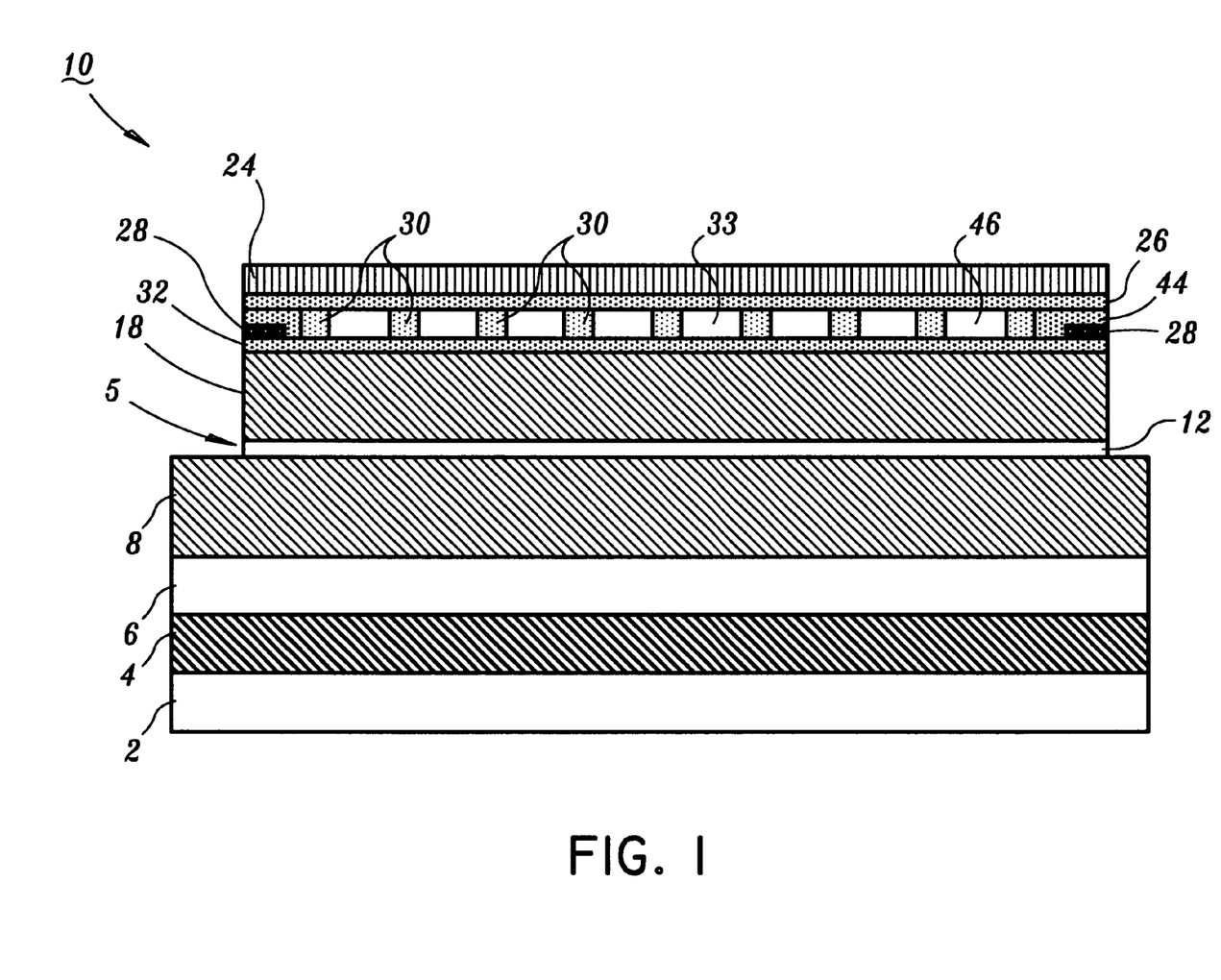
FIG. 1 is a cross-sectional view of a liquid crystal display device in accordance with the present invention.

Referring now to the drawings in which like numerals represent the same or similar elements and initially to FIG. 1, a cross-sectional view of a liquid crystal display device 10 is provided with a touch sensor of the present invention. A liquid crystal layer 12 is sandwiched between a thin film transistor (TFT) array plate 8 and a color filter array plate 18. Plates 8 and 18 are preferably made of a glass material. Plate 18 is preferably a color filter glass. A thin film transistor (TFT) array 5 is formed on a surface of a TFT array plate 8 facing the liquid crystal layer 12, in which electrodes for each PEL (picture element or pixel) are arranged. A polarizer 6, a diffusion sheet 4 and a backlight 2 may be coupled to plate 8 opposite the liquid crystal layer 12. Polarizer 6, diffusion sheet 4 and backlight 2 function as is known in the art.

A polarizer 24 is disposed over plate 18 opposite the liquid crystal layer 12. In accordance with the present invention, a transparent conductive layer 26, such as Indium Tin Oxide (ITO) or Indium Zinc Oxide (IZO) is deposited on polarizer 24. A transparent conductive layer 32 is deposited on color filter plate 18 facing layer 26. Conductive layer 32 preferably has a uniform conductivity of about 400 Ohms/sqr. A preferred range of conductivity may include conductivities from about 200 Ohms/sqr. to about 800 Ohms/sqr.

Conductive layer 32 provides resistance such that a voltage gradient may be sustained across conductive layer 32.

A linearization pattern 28 is then deposited around the edges outside an active area of the display on (or under) conductive layer 32. The width of pattern 28 is preferably less than the distance between the active area of the display and the edge of the color filter plate 18, the width being about 2 mm to about 3.3 mm. Preferably, pattern 28 is a continuous pattern without "gaps" (See FIG. 3) which may cause a "ripple" in the field distribution which is difficult to correct with software.

Figure 3:
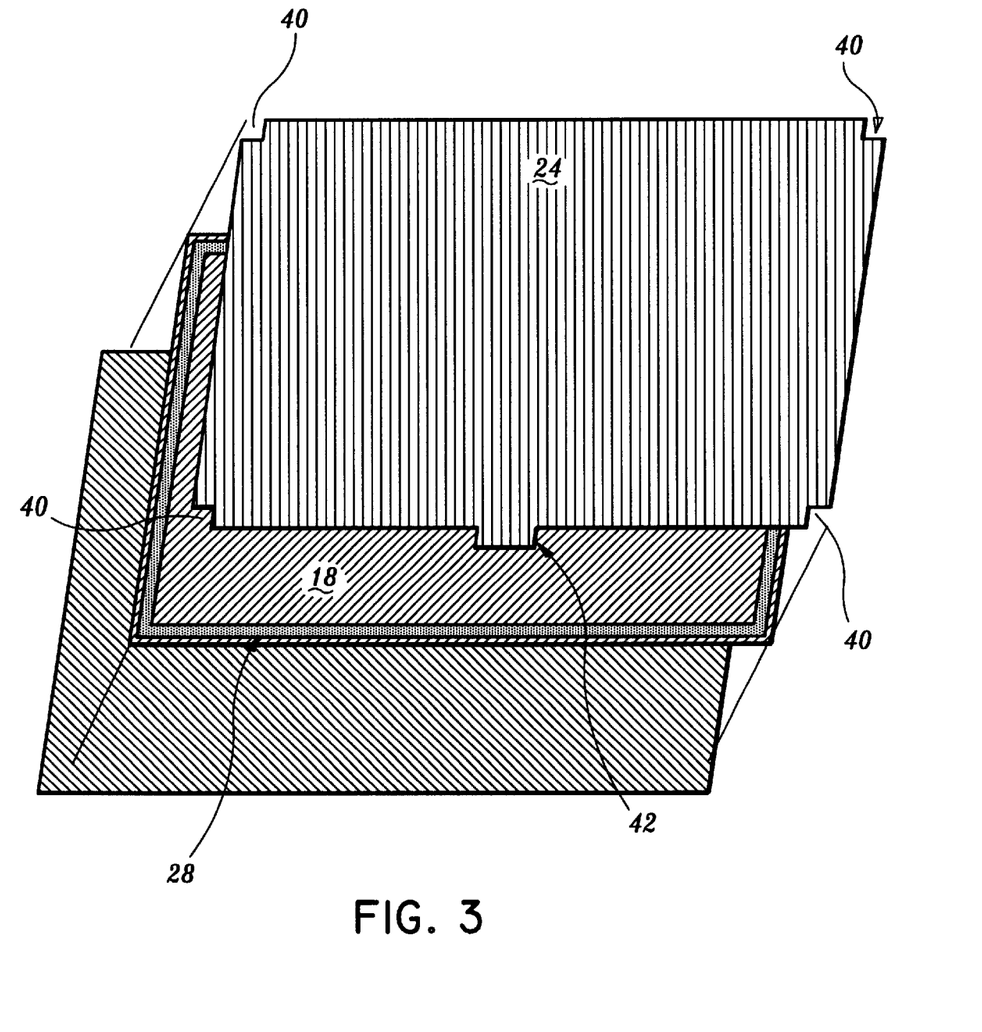
FIG. 3 is a perspective view with layers separated of the liquid crystal display device shown in FIG. 1.

When space is limited for the linearization pattern 28, a limited linearization is performed using a simple rectangular frame pattern (FIG. 3). A low resistance material can be deposited to form linearization pattern 28 either by sputtering through a pair of metal masks patterned to form pattern 28 or by screen printing of a conductive ink. If more space is available, other conventional linearization patterns may be used. Further, at higher cost, a finer resolution linearization pattern may be employed.

In accordance with the invention, a standard polarizer may be modified as follows to make it suitable for use as a deformable sheet. Conductive layer 26, such as ITO, is deposited onto the bottom of polarizer 24 and no continuous adhesive layer is applied. A continuous array of spacer bumps 30 is either formed on conductor layer 26 of polarizer 24 by a method such as embossing or screen printing, or the array of spacer bumps 30 is formed on the back of color filter array plate 18, but over a transparent conductor layer 32 and linearization pattern 28 formed on color filter array plate 18. Spacer bumps 30 are of a non-conductive nature, are preferably transparent, and may be of a thermal plastic or other material which can be subsequently used to adhere conductor layer 26 of polarizer 24 or to conductor layer 32 of color filter plate 18 at the location of the spacer bumps 30. In a preferred embodiment, a spacer bump 30 height is about 0.001 inches, although spacer bump heights may be between about 0.0002 inches to about 0.004 inches. A gap 33 between layer 26 and layer 32 is preferably about 25 microns.

Figure 2:
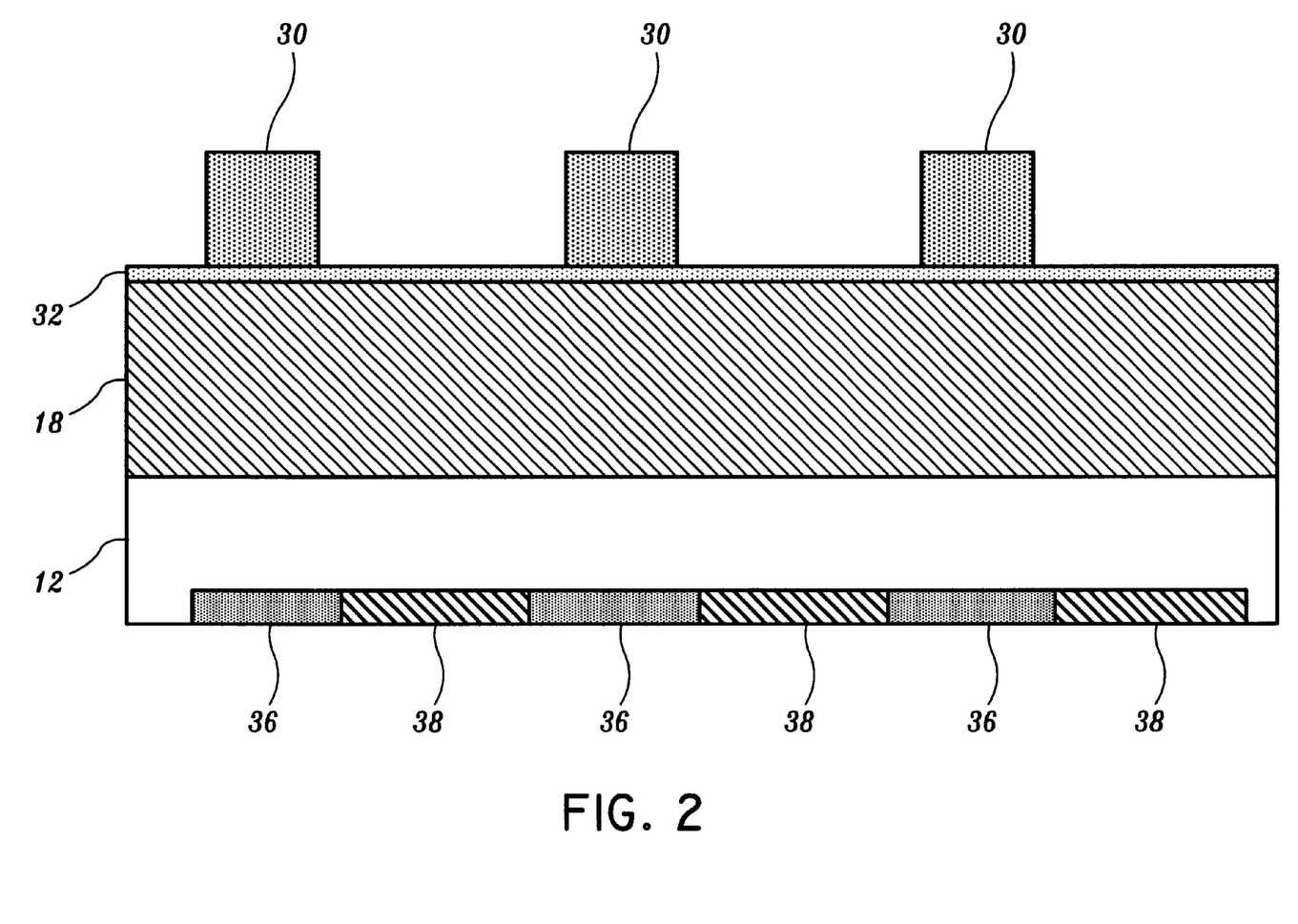
FIG. 2 is a cross-sectional view of one embodiment of liquid crystal display device of FIG. 1 showing placement of spacer bumps or dots in accordance with the present invention.

Referring to FIG. 2, spacer bumps 30 may also be aligned with a black matrix 36, common to LCDs, and disposed between the Red, Green, and Blue subpixels 38 to minimize the visibility of spacer bumps 30. This may be done, for example, by using a photosensitive polymer for the spacer bumps or spacers 30 and a back exposure to develop the spacers in combination with other patterning techniques.

Referring to FIGS. 1 and 3, before polarizer 24 and LCD (color filter, TFT array plate etc.) are assembled together, polarizer 24 is cut to form notches 40 to expose four corners of color filter plate 18 so that electrical contacts can be made to linearization pattern 28. A tab 42 is formed on polarizer 24 which extends beyond one edge of color filter plate 18 so that electrical contact can be made to conductor layer 26 (FIG. 1) on the bottom of polarizer 24. Conductive layer 26 on polarizer 24 may be attached by applying an adhesive 44 (FIG. 1) to linearization pattern 28 on color filter plate 18 (or to conductive layer 26 of polarizer 24). Adhesive 44 may be applied using a needle dispense tool or by printing and then joining and curing.

If thermal plastic spacer bumps 30 are used, spacer bumps 30 may be employed to join polarizer 24 and color filter plate 18. An appropriate temperature and pressure may be applied to join polarizer 24 and color filter plate 18 in the array area during a cure cycle. In one embodiment, gap 33 is filled between the polarizer and the color filter plate with an index matched insulating liquid 46 to reduce reflections.

Referring again to FIGS. 1 and 4, a schematic diagram is shown for detecting the position of a finger, stylus or other device shown by arrow "A" in accordance with the present invention. In 5-wire resistive membrane scheme, a touch sensor is formed using polarizer 24 with a position detecting electrically conductive layer 26 formed thereon. Electrodes 50 (incorporated into linearization pattern 28) are provided on transparent conductor layer 32. Positions where contacts are made to linearization pattern 28 are referenced to as electrodes 50. A uniform electric field gradient of low voltage is applied to conductive layer 32 by applying a voltage to two adjacent positions, preferably corners of linearization pattern 28, along linearization pattern 28. Linearization pattern 28 generates a voltage gradient across layer 32 in a first direction, say the x direction, and then a voltage gradient orthogonal to the first direction, say the y direction is formed by changing which corners the potential is applied to. A touch at a position X,Y on a surface of polarizer 24 causes a voltage magnitude to be transmitted through tab 42 to define a voltage in the first direction corresponding to the X coordinate. Then, the voltage gradient is generated orthogonally to provide a Y coordinate in the same way.

Figure 4:
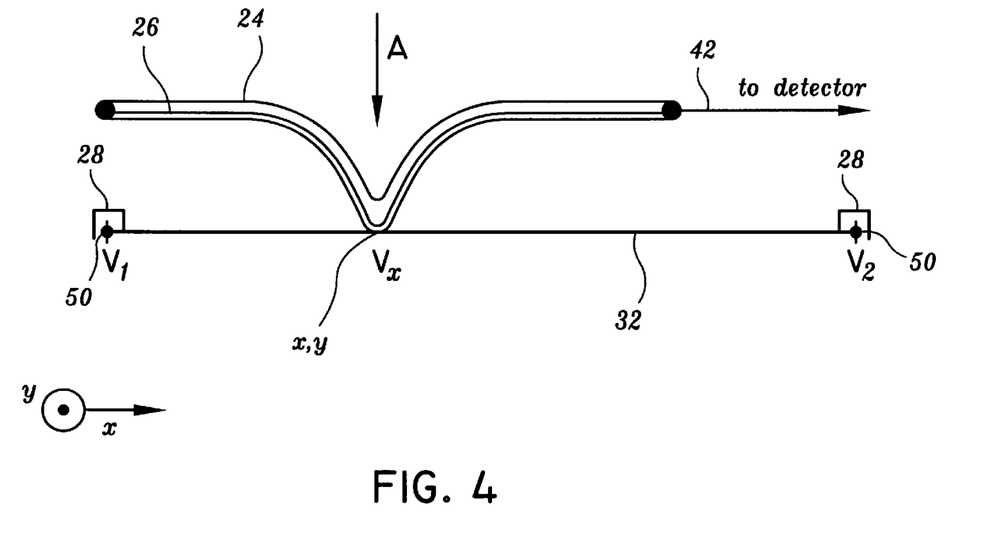
FIG. 4 is a schematic diagram of a cross-section of an embodiment of the present invention.

Polarizer 24 is preferably a flexible resistive sheet such that upon touching the sheet a deformation is provided which contacts layer 26 to layer 32 at the position X,Y to cause currents to flow through tab 42. By measuring the voltages, a determination of an X position according to the gradient in the first direction and the Y position according to the gradient in the second direction may be made. An alternate method for determining the location is to provide a voltage to layer 26 relative to layer 32 and to measure the current flow differences between the corners as described in U.S. Pat. No. 4,293,734, incorporated herein by reference.

Figure 5:
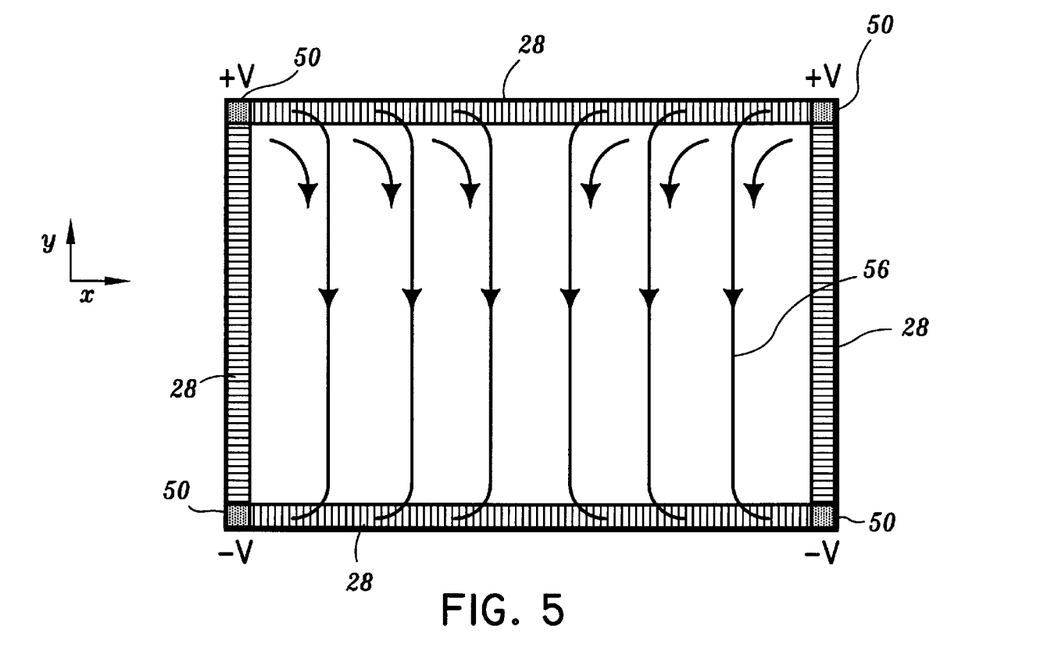
FIG. 5 is a top plan view showing a voltage gradient generated for implementing the present invention.

Referring to FIG. 5, a distribution of the electric field lines is shown in the Y direction when the voltage is applied to electrodes 50 at four corners. A linearization pattern 28 is provided to form a uniform electric field 56. Linearization pattern 28 is formed between conductive layer 26 and conductive layer 32. Various types of the linearization patterns are possible. Electrodes 50 are provided at the four corners, and linearization pattern 28 is provided along the edge of conductive layer 32. The distribution of the electric field lines 56 are shown for the case that the ideal linearization is realized. The straight electric field lines 56 are evenly spaced, in other words, the adjacent equipotential lines are separated by a uniform space which correlates a value of voltage with the touched position when layers 26 and 32 are contacted.

In the present invention, conductive layer 26 is integrally formed on polarizer 24. In the prior technology, the touch sensor having the glass substrate provided with the position detecting electrically conductive film is prepared as a separate component, and this touch sensor is mounted with an overlap on the screen of the image display device. In this case, the weight of the glass substrate of the touch sensor is added to the weight of the image display device, the total thickness of the image display device is increased, and the fabrication cost is increased. Further, there is the possibility that the touch sensor mechanically mounted to the image display device might be disengaged from the image display device due to an unexpected shock, so that this type of touch sensor is generally unsuitable for the portable type image display device.

Figure 6:
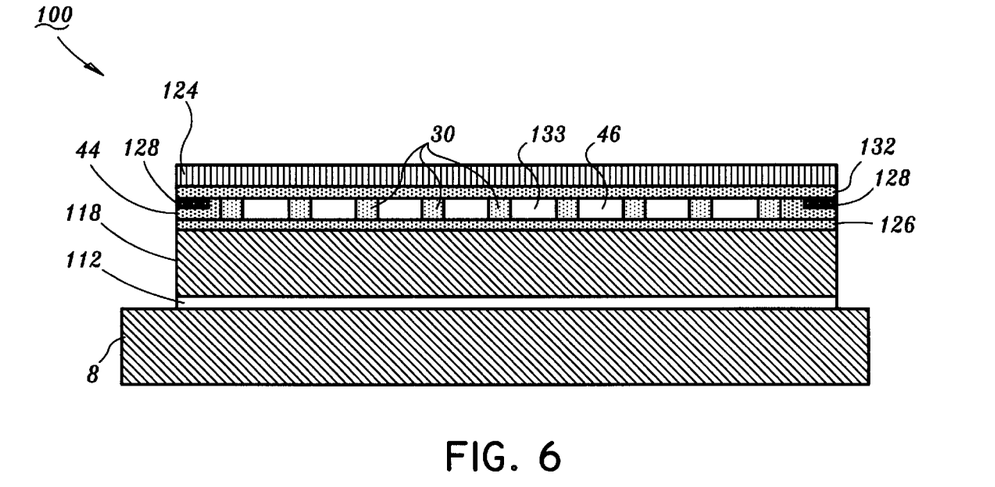
FIG. 6 is a cross-sectional view of another embodiment of a liquid crystal display device showing a conductive layer of polarizer used to generate voltage gradients in accordance with the present invention.

Referring to FIG. 6, an alternate embodiment of the present invention is shown in which a linearization pattern is formed on a polarizer as will be described. An LCD 100 includes a polarizer 124 disposed over a color filter plate 118 opposite a liquid crystal layer 112. In accordance with the present invention, a transparent conductive layer 132, such as Indium Tin Oxide (ITO) or Indium Zinc Oxide (IZO) is deposited on polarizer 124. A transparent conductive layer 126 is deposited on color filter plate 118 facing layer 132. Conductive layer 132 preferably has a uniform conductivity of about 400 Ohms/sqr. A preferred range of conductivity may include conductivities from about 200 Ohms/sqr. to about 800 Ohms/sqr. Conductive layer 132 provides resistance such that a voltage gradient may be sustained across conductive layer 132.

A linearization pattern 128 is then deposited around the edges outside an active area of the display on (or under) conductive layer 132. Preferably, pattern 128 is a continuous pattern without "gaps" which may cause a "ripple" in the field distribution which is difficult to correct with software.

A low resistance material can be deposited to form linearization pattern 128 either by sputtering through a pair of metal masks patterned to form pattern 128 or by screen printing of a conductive ink. Further, at higher cost, a finer resolution linearization pattern may be employed.

In accordance with the invention, a standard polarizer may be modified as follows to make it suitable for use as a deformable sheet. Conductive layer 132, such as ITO, is deposited onto the bottom of polarizer 124 and no continuous adhesive layer is applied. A continuous array of spacer bumps 30 is either formed on conductor layer 132 of polarizer 124 by a method such as embossing or screen printing, or the array of spacer bumps 30 is formed on the back of color filter array plate 118, but over transparent conductor layer 126. Linearization pattern 128 is formed on conductive layer 132. Spacer bumps 30 are of a non-conductive nature, are preferably transparent, and may be of a thermal plastic or other material which can be subsequently used to adhere conductor layer 132 of polarizer 124 or to conductor layer 126 of color filter plate 118 at the location of the spacer bumps 30. A gap 133 is preferably about 25 microns.

Figure 7:
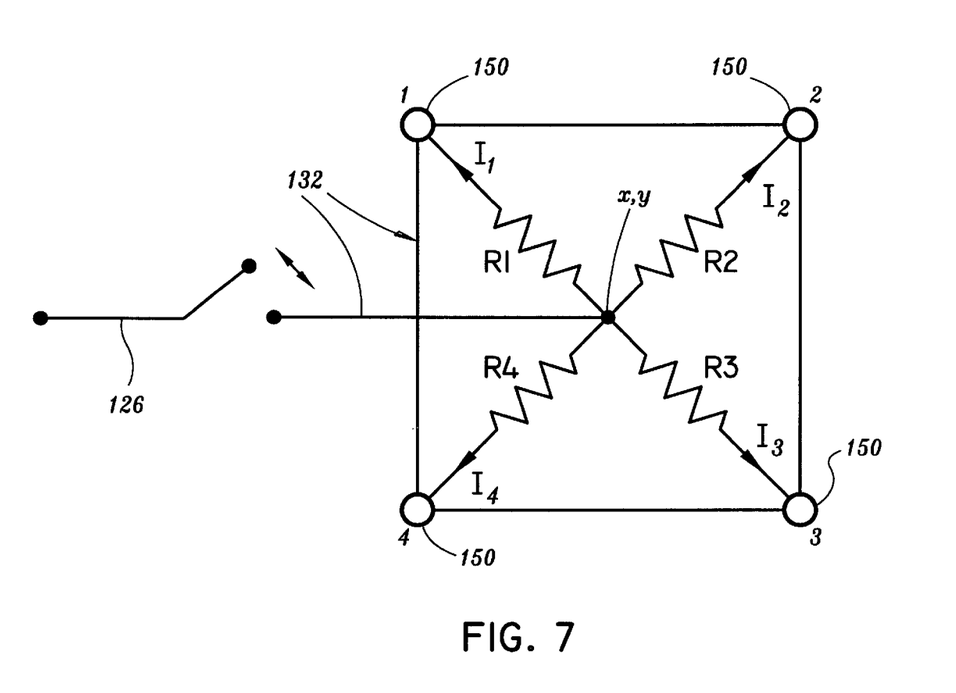
FIG. 7 is a schematic diagram for a circuit for determining a touched position with use with the present invention.

Referring to FIGS. 6 and 7, a schematic diagram is shown for an alternate 5-wire method for detecting the position of a finger, stylus or other device in accordance with the present invention. A touch sensor is formed using polarizer 124 with a position detecting electrically conductive layer 132 formed thereon. Electrodes 150 are provided on four positions of linearization pattern 128, and more preferably the positions are located at the corners of the display. An electric field of low voltage is uniformly distributed over electrically conductive layer 132 relative to layer 126 by applying a voltage to linearization pattern 128 through electrodes 150. Linearization pattern 128 generates a voltage across layer 132 such that upon contact between layers 132 and 126 current flows in all four electrodes 150. A touch at a position X,Y on a surface of polarizer 124 causes a current flow to the corners which is used to determine the coordinates of the touched position. In the case where the linearization of layer 132 is perfect (ideal case), the positional coordinates can be calculated by the following equations.

$$X = [(I2+I3) - (I4+I1)] / [(I2+I3) + (I4+I1)] \quad (1)$$

$$Y = [(I2+I1) - (I4+I3)] / [(I2+I3) + (I4+I1)] \quad (2)$$

where I1, I2, I3 and I4 are the corner currents shown in FIG. 7.

Detection methods for touch location, in accordance with the present invention, may include the following. For the 5-wire methods one conductive layer is linearized and either orthogonal uniform voltage gradients are used or corner currents are used to determine the touch location. With a 4-wire method, linearization is not needed and orthogonal voltage gradients are alternately applied to the two conductive layers and sensed by the other as described above. All of these alternative detection methods may be employed in accordance with the invention.

A thin layer of any material which is transparent and has an uniform resistive value may be used as conductive layers 26, 132. Examples of the material include ITO (Indium Tin Oxide), IZO (Indium Zinc Oxide) etc. These layers may be formed by a physical film forming process, such as a sputtering, and/or a chemical film forming process, such as chemical vapor deposition (CVD). A preferable range of the resistive value of conductive layer 26, 132 is between about 200 to about −800-Ohms/sqr., more preferably, 300 to −500-Ohms/sqr.

It is necessary that linearization patterns 28, 128 have a sufficiently small resistive value to realize that the electric field initially extends from one electrode along the horizontally extended electrically conductive strip of the linearization pattern. It is desirable that the electrically conductive strips of the linearization pattern have the resistive values represented by the following equations.

$$R_{pattern}(\text{side}) = -0.5 \rho_{detect}(W/H) \text{ (Ohms)}$$

$$R_{pattern}(\text{top}) = -0.5 \rho_{detect}(H/W) \text{ (Ohms)}$$

The "$R_{pattern}(\text{side})$" represents the resistive value of one of electrically conductive strips disposed at the horizontal edges of the four edges, the "$R_{pattern}(\text{top})$" represents the resistive value of one of electrically conductive strips disposed at the vertical edges of the four edges, the "$\rho_{detect}$" represents the sheet resistivity value in Ohms/square of the position detecting electrically conductive film, the "W" represents the length of the horizontal edges of the position detecting electrically conductive film, and the "H" represents the length of the vertical edges of the position detecting electrically conductive film. In the case of the portable liquid crystal display device, since the available space for the linearization pattern is usually only 2–3 mm, it is difficult to decrease the resistive value of the linearization pattern. For this reason, the resistive value of the position detecting electrically conductive film should be selected to be a large value. Accordingly, the effects of the linearization becomes insufficient when the resistive value becomes small.

Any material which has the desired resistive value and shows stability may be used as the material of the linearization pattern. For example, Ag, MoW, or other metals may be used. To form linearization pattern 28, 128, the electrically conductive material may be directly deposited, or an ink which includes electrically conductive material is dispersed in a polymer, such as an epoxy resin may be deposited. Various processes, such as a screen printing, sputtering, etching, etc. can be used to form the linearization pattern. The present invention may also be employed for a 4-wire resistive membrane scheme.

Having described preferred embodiments of a liquid crystal display with integrated resistive touch sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A liquid crystal display with an integrated touch sensor comprising:
   a first substrate including a color filter plate having a first conductive layer formed thereon;
   a linearization pattern formed on the first conductive layer, wherein the linearization pattern applies voltage gradients across the first conductive layer; and
   a flexible polarizer having a second conductive layer formed thereon facing the first conductive layer across a gap formed therebetween, the polarizer providing a contact surface such that a touched position on the polarizer causes contact between the first conductive layer and the second conductive layer thereby identifying a location of the touched position.

2. The display as recited in claim 1, wherein the flexible polarizer includes a flexible plastic material.

3. The display as recited in claim 1, wherein the first and second conductive layers include at least one of Indium Tin Oxide and Indium Zinc Oxide.

4. The display as recited in claim 1, wherein the first substrate is a rigid transparent material.

5. The display as recited in claim 1, wherein the linearization pattern is formed about a periphery of the first substrate and includes at least three electrodes for providing the voltage gradient, wherein the linearization pattern applies voltage gradients in two orthogonal directions.

6. The display as recited in claim 1, wherein the polarizer is coupled to the first substrate about a periphery of the first substrate.

7. The display as recited in claim 1, wherein the gap is maintained by employing insulating spacers.

8. The display as recited in claim 7, wherein the spacers are employed to attach the first and second conductive layers.

9. The display as recited in claim 7, wherein the spacers are disposed in operational relationship with a black matrix formed on the first substrate.

10. The display as recited in claim 1, wherein the gap is filled with an insulating index matched liquid to reduce light reflections.

11. A liquid crystal display with an integrated touch sensor comprising:
    a first substrate including a color filter plate having a first conductive layer formed thereon;
    a flexible polarizer having a second conductive layer formed thereon facing the first conductive layer across a gap formed therebetween;
    a linearization pattern formed on the second conductive layer, wherein the linearization pattern applies voltage gradients across the second conductive layer; and
    the polarizer providing a contact surface such that a touched position on the polarizer causes contact between the first layer and the second layer thereby inducing current flow across electrodes connected to the second conductive layer thereby identifying a location of the touched position.

12. The display as recited in claim 11, wherein the flexible polarizer includes a flexible plastic material.

13. The display as recited in claim 11, wherein the first and second conductive layers include at least one of Indium Tin Oxide and Indium Zinc Oxide.

14. The display as recited in claim 11, wherein the first substrate is a rigid transparent material.

15. The display as recited in claim 11, wherein the linearization pattern is formed on the second conductive layer about a periphery of the polarizer and the electrodes include four electrodes, wherein the linearization pattern applies voltage gradients in two orthogonal directions.

16. The display as recited in claim 11, wherein the gap is maintained by employing insulating spacers.

17. The display as recited in claim 16, wherein the spacers are employed to attach the first and second conductive layers.

18. The display as recited in claim 16, wherein the spacers are disposed in operational relationship with a black matrix formed on the first substrate.

19. The display as recited in claim 11, wherein the gap is filled with an insulating index matched liquid to reduce light reflections.

20. A liquid crystal display with an integrated touch sensor comprising:
    a first substrate including a color filter plate having a first conductive layer formed thereon;
    a flexible polarizer having a second conductive layer formed thereon facing the first conductive layer across a gap formed therebetween, the polarizer providing a contact surface such that a touched position on the polarizer causes contact between the first conductive layer and the second conductive layer thereby identifying a location of the touched position by a first voltage gradient being provided across the first conductive layer while the second conductive layer is employed as a sensor layer for the touched position and a second voltage gradient being provided orthogonally to the first voltage gradient across the second conductive layer while the first conductive layer is employed as the sensor layer for the touched position; and
    an insulating index matched liquid disposed in the gap to reduce light reflections.

21. The display as recited in claim 20, wherein the flexible polarizer includes a flexible plastic material.

22. The display as recited in claim 20, wherein the first and second conductive layers include at least one of Indium Tin Oxide and Indium Zinc Oxide.

23. The display as recited in claim 20, wherein the color filter plate is formed from a rigid transparent material.

24. The display as recited in claim 20, wherein at least three electrodes provide the voltage gradients.

25. The display as recited in claim 20, wherein spacers are employed to attach the first and second conductive layers.

* * * * *